United States Patent [19]
Kauffman et al.

[11] Patent Number: 5,315,522
[45] Date of Patent: May 24, 1994

[54] TABLE BENDER CONTROLLER

[75] Inventors: Kenneth A. Kauffman, R.D. #12, Pisgah Rd., York, Pa. 17406; Stephen C. Davis, Wrightsville; Frederick W. Wise, Windsor, both of Pa.

[73] Assignee: Kenneth A. Kauffman, York, Pa.

[21] Appl. No.: 972,942

[22] Filed: Nov. 6, 1992

[51] Int. Cl.⁵ .................... G06F 15/46; B21D 7/12
[52] U.S. Cl. .................... 364/474.07; 72/7; 72/307; 364/474.22
[58] Field of Search .............. 364/146, 188, 189, 468, 364/474.07, 474.22, 474.24, 474.26, 476; 72/7, 217, 307, 379.2, 388

[56] References Cited

U.S. PATENT DOCUMENTS

| | | | |
|---|---|---|---|
| 3,821,525 | 6/1974 | Eaton et al. | 364/468 |
| 4,074,350 | 2/1978 | Roch et al. | 364/474.07 |
| 4,131,003 | 12/1978 | Foster et al. | 72/7 |
| 4,161,110 | 7/1979 | Ritter et al. | 72/7 |
| 4,719,577 | 1/1988 | Eley | 72/7 |
| 4,998,206 | 3/1991 | Jones et al. | 364/468 |
| 5,005,394 | 4/1991 | Sartorio et al. | 364/474.07 |
| 5,029,462 | 7/1991 | Wakahara et al. | 72/379.2 |

Primary Examiner—Jerry Smith
Assistant Examiner—Steven R. Garland
Attorney, Agent, or Firm—Samuel M. Learned, Jr.

[57] ABSTRACT

A table bender controller employing a computerized display screen with the computer therefor being programmed to take keyed-in entry of customer provided bar shape specifications, whether entered by the machine operator at the machine location or from corresponding specification input data downloaded from a remote location input terminal, which specifications are in terms of a finished dimension of the bent bar profile along with the diameter of the bar to be bent and the bend degrees and directions of bend to produce the required shape, all of which either after key-in or downloading is called up in graphical display on the screen in a visual profile corresponding to that to be bent with appropriate machine and bar set instructions for producing such shape, including bending sequence, dimensions, gage marks, pin sizes and ram location for each of the component bends in the sequence.

5 Claims, 12 Drawing Sheets

Fig. 5

BEND ANGLE TEST AND ADJUSTMENT

BAR: #4           SPEED: HIGH

---

DIRECTION: 90° CW

COUNTS: 110

TEST BEND

USE TAB TO SELECT

+ OR − TO CHANGE THE HIGHLIGHTED VALUE

Fig. 6

| QUANTITY | SIZE | LENGTH | MARK | 800 | |
|---|---|---|---|---|---|
| 1 | 4 | 8 - 06 | B425 | | |
| JOB NO. | RELEASE | PG | ITEM | DRAWING NO. | TAGS | GRADE | BC |
| 91314 | 2 | 1 | 28 | R - 29 | 1 OF 1 | 60 | 1 |
| CUSTOMER OR JOB NAME | | REFERENCE | | WEIGHT | CC |
| TRIANGLE BUILDERS | | PO 92-283 | | 68 | MXE |
| MATERIAL DESCRIPTION | | SEQ | MB | BI |
| SECOND FLOOR, POUR #1 | | 7/5 | 11B | 15 |

TYPE: T10

RUN: 020601-21

1-09, 0-09, 1-00, 1-06, 1-00, 2-06

72 → "a"

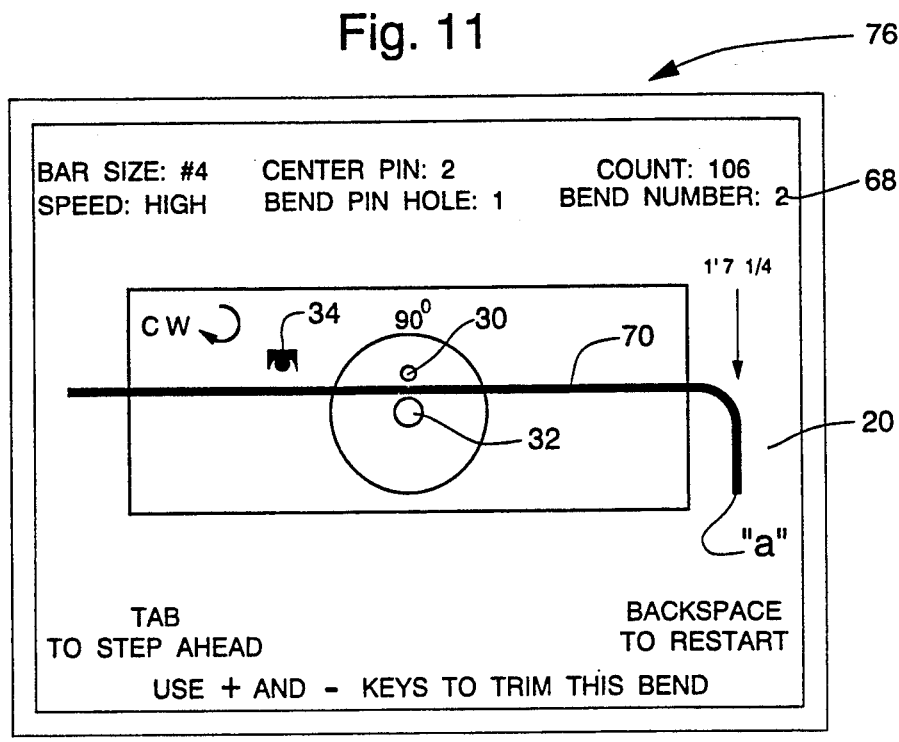
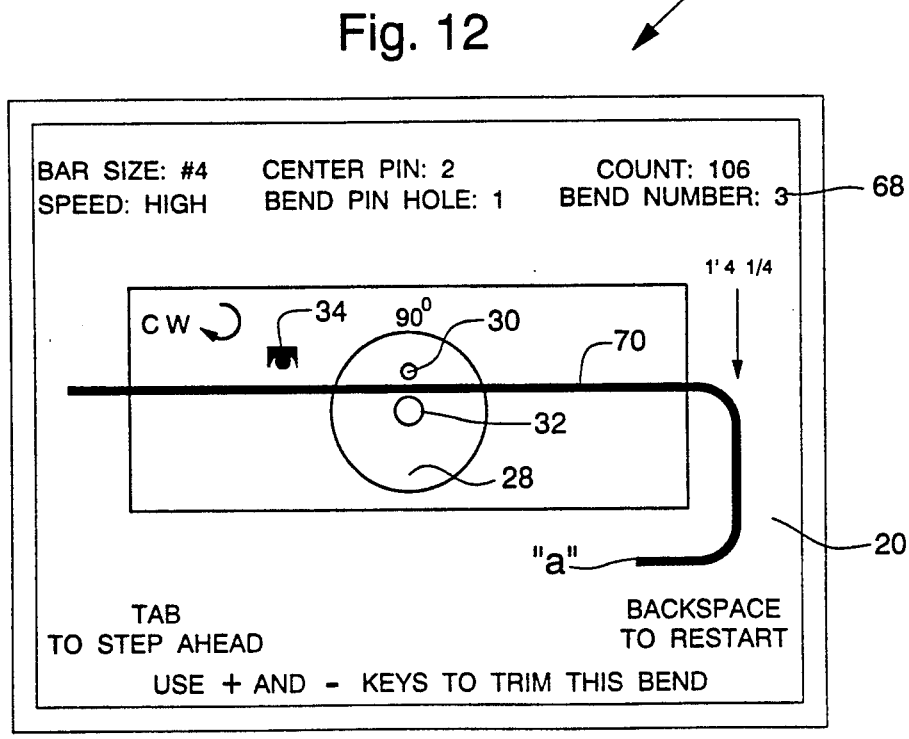

TABLE BENDER CONTROLLER

BACKGROUND OF THE INVENTION

The present invention, herein denominated a table bender controller, relates to an electronic visual aid device which is designed to enhance the ease and certainty whereby an operator of a manually cycled table bending machine Of that type typically used for bending concrete reinforcing bar may make the various shapes employed in concrete reinforcing applications to specification, with greater efficiency and less waste.

Typically, operators of manually cycled table bending machines are individuals skilled in the art by way of on the job trial-and-error training and or the use of bend charts developed through trial-and-error experience, in handling various bar lengths and diameters that must be bent to a wide range of shapes and reasonably close dimensional tolerances, and in most jobs the run lengths are relatively short. Thus, even with a highly skilled and experienced operator it is frequently necessary with a new shape that he trial-and-error bend a particular profile a number of times before getting the right center pin radius and bend hole position on the bending table head, the proper machine speed and most efficient bending sequence, and a "feel" for how the particular bar stock will machine through the bending cycle.

In an effort to reduce operator training time and that experiential developed skill level necessary for efficient and economical bent bar production off a manually cycled table bending machine there was developed a digital readout table bender control head such as that exemplified in U.S. Pat. No. 4,719,577 to Eley dated Jan. 12, 1988, for bending conduit and pipe, as well as that digital control head shown in a technical sheet of the assignee of applicant herein being KRB Machinery Co., of R.D. #12, Pisgah Rd., York, PA, captioned "TABLE BENDER CONTROL HEAD", designed as either an original or retrofit control for a manually cycled table bending machine employed to bend concrete reinforcing bar. In the case of digital readout control units, such as the foregoing, bend specifications are operator keyed into a control module and tested, which then gives a numerical readout of the bend angle count for each bend and whether it is a clockwise or counterclockwise bend direction. The digital control head does not, however, provide a screen image of the total part profile with bend sequence, nor machine sets and specific instructions for machine operation in order to accomplish each sequential bend cycle of the profile.

The next stage of bending machine control is that such as shown in U.S. Pat. No. 4,161,110 to Ritter et al dated Jul. 17, 1979, which teaches a fully automatic bending operation with the substantially increased cost factors attendant to such a machine and the longer run lengths required to warrant its use.

The integrated combination of applicant's invention for a table bender controller with the typical manually cycled table bending machine, however, effectively and efficiently fills a production void between such machines operated purely by developed skill of an operator or a machine equipped with a digital control head on the one hand and the fully automatic bending machine on the other, while at the same time being adaptable to use with a large number of manually cycled table bending machines and eliminating the need or necessity for a highly experienced operator in order to obtain consistent short to medium run output of specified bent bar production at a substantially increased rate and lower levels of waste, with little chance of error.

SUMMARY OF THE INVENTION

It is the principal object of the present invention to provide a table bender controller which employs a computerized display screen to produce a visual image of the bent bar product to be made along with a set of sequential bending instructions to accomplish the same as generated from either machine position operator keyed-in customer provided specifications in terms of a finished dimension bent bar profile along with the diameter of the bar to be bent and the bend degrees and directions of bend to Produce the required shape, or from corresponding specification input data downloaded from a remote location input terminal which thereby eliminates operator set-up time and likelihood for error.

It is another object of the present invention to provide a table bender controller Which is adapted to be universally installable upon and utilized with a typical manually cycled table bending machine.

It is also an object of the present invention to provide a table bender controller which enables the upgrading of a typical manually cycled table bending machine to fill that current technology and convenience void between such machines equipped with purely digital control devices and those machines which are fully automated.

Still another object of the present invention is to provide a table bender controller the use of which greatly reduces operator training time and that skill level which is otherwise required to consistently produce commercially acceptable output product off the typical manually cycled table bending machine.

A further object of the present invention is to provide a table bender controller that enables an enhanced machine output capability equivalent to more complicated and expensive bar bending machines, but at a substantially lower cost.

Yet another object of the present invention is to provide a table bender controller that is a significant operator convenience enhancement over currently available digital controllers which simply provide a number readout without the benefit of a visually sequenced bending profile and detailed Processing instructions for accomplishing the bending cycle all without being more expensive or complicated to use.

It is also an object of the present invention to provide a table bender controller which is simply and easily calibrated to the particular table bending machine upon which it is assembled The foregoing, and other objects hereof, will be readily evident upon a study of the following specification and accompanying drawings comprising a part thereof.

DESCRIPTION OF THE DRAWINGS

FIG. 5 is the table bender controller screen exemplary display for a bender calibration bend angle test and adjustment mode.

FIG. 6 is a first exemplary customer provided bar shape specification job card for operator keyed-in data entry to the table bender controller.

FIG. 11 is the table bender controller screen display graphically illustrating operator instructions for executing the second bend of that bar shape as specified on the first exemplary job card illustrated in FIG. 6.

FIG. 12 is the table bender controller screen display graphically illustrating operator instructions for executing the third bend of that bar shape as specified on the first exemplary job card illustrated in FIG. 6.

DETAILED DESCRIPTION OF THE INVENTION

Figure 1:
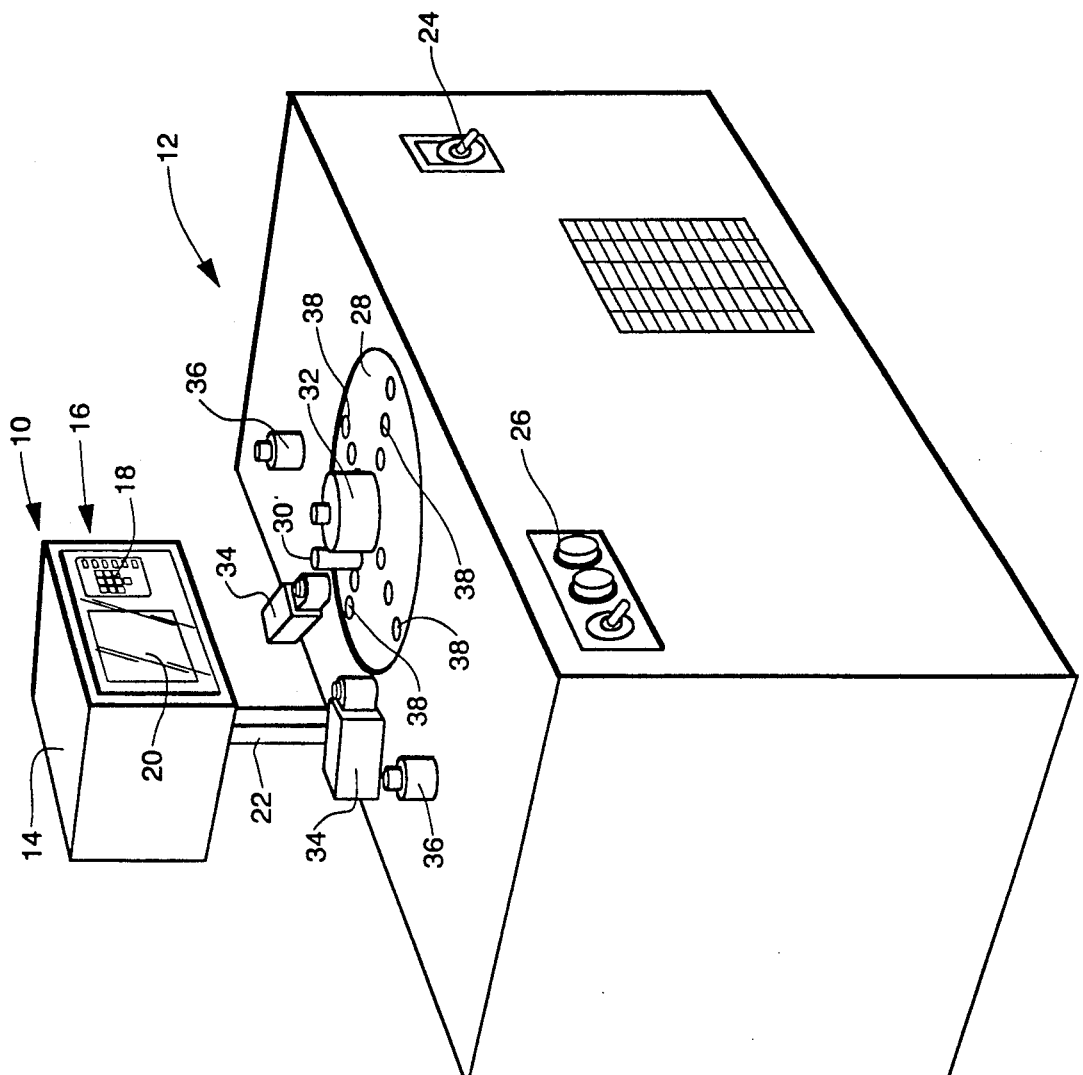
FIG. 1 is perspective elevation view showing the table bender controller of instant invention operationally installed upon an exemplary manually cycled table bending machine.

Referring to FIG. 1, the table bender controller 10 of present invention is shown assembled in operational installation upon an exemplary manually cycled table bending machine 12, the latter of which is used for example to bend steel reinforcing bar and rod into various shapes for employment in concrete reinforcing applications, wherein said table bender controller 10 is provided with an enclosure cabinet 14 within which is housed a computer accessed by way of the computer control consol 16 having a plurality of input function keys 18 and a screen 20 for graphical display of bending profile sequences and operator instructions, and is connected by cable conduit 22 in integrated circuit communication with said machine 12. The exemplary manually cycled table bending machine 12 is of typical design and operation, having a power on switch 24 and controls 26 by which the table bending head 28 is rotated to drive the bend pin 30 and thereby wrap a length of bar or rod about the center pin 32 to make a bend as will hereinafter be more fully explained, and in addition is provided with back-up rams 34 and stops 36 which together provide means whereby a bar or rod is controlled during the carrying out of bend cycles. As is also shown in FIG. 1, the table bending head 28 is provided with a plurality of bend pin openings 38 which thereby allows for movement of the bend pin 30 to various table bending head 28 locations depending first on the bar or rod bending profile to be accomplished, and second the diameters of both the bend pin 30 and center pin 32 which are interchangeable depending on the thickness of the bar or rod to be bent and the radii of bends to be made.

Figure 2:
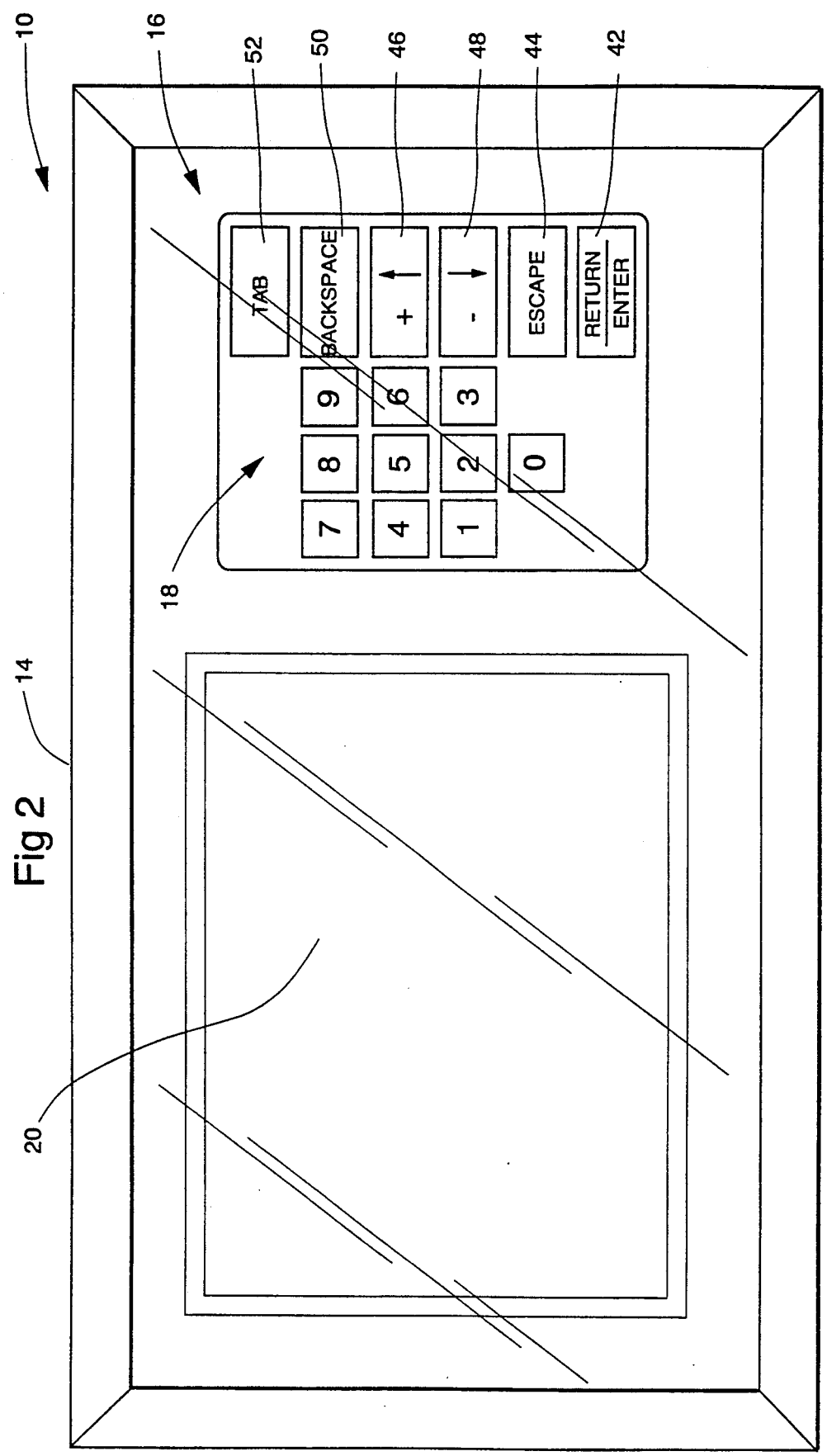
FIG. 2 is an enlarged front elevation of the table bender controller console and screen as shown in FIG. 1.

Referring now to the enlarged front elevation view of the table bender controller 10 computer control console 16 with input function keys 18 and screen 20 as shown in FIG. 2. The control console 16 input function keys 18 are typical and explained thus. The controller 10 is powered up through the integrated circuitry of cable conduit 22 when the machine 12 power on switch 24 is activated, which also illuminates the screen 20. When the screen 20 has cleared the controller 10 is then ready for use. An initial pressing the enter/return key 42 enables an operator to access for selection the operational mode within which he wants to work and the escape key 44 enables him to exit the particular mode of operation. The plus key 46 and minus key 48 respectively enable the operator to either increase or decrease the bend count when calibrating the controller 10 to either a particular bar size or when the diameter of the center pin 32 is changed. The backspace key 50 enables one to backspace Within the operational mode, and the tab key 52 enables one to sequentially tab through the individual bend profiles and bend instructions for a particular bending profile cycle during actual operational use of the controller 10 in accomplishing bar or rod bending. The numbered keys 0 through 9 enable the operator to enter various elements of data in a selected operational mode, and in particular bend profile data when in the calibration mode and customer specification data when in the manual input mode. Thereafter it is on the screen 20 that the bend profile and bend instructions are graphically projected as an operator tabs through the bend cycle sequence for accomplishing a manually cycled bending operation.

Figure 3:
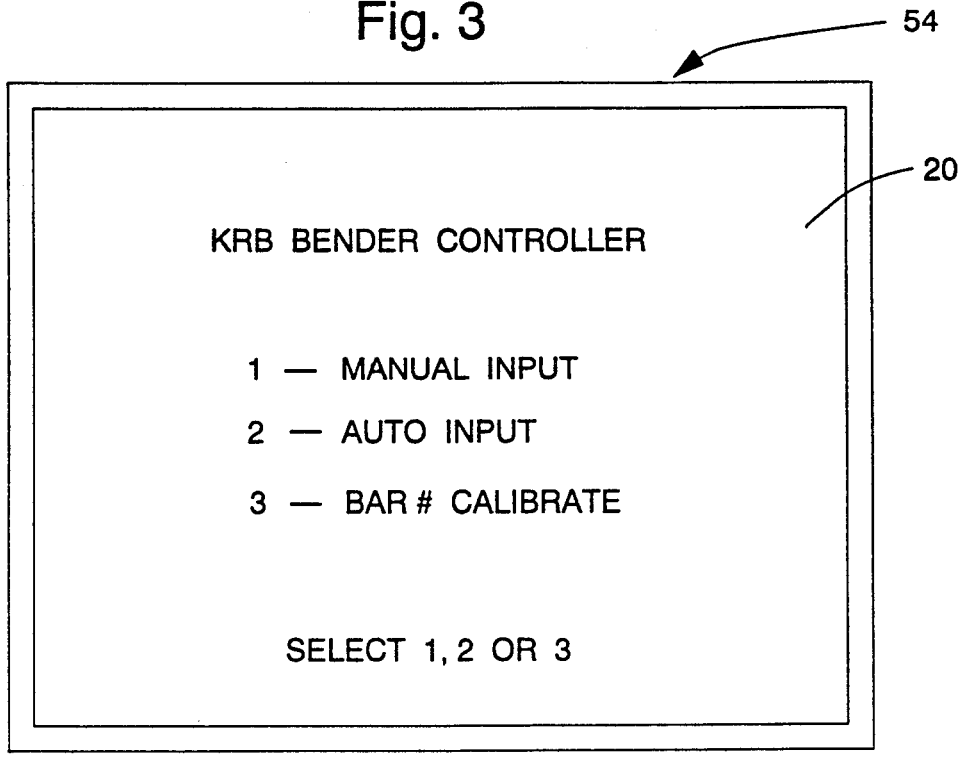
FIG. 3 is the table bender controller screen display for selecting a mode of input function.

Considering now specific methodology of operating the table bender controller 10 by referring to FIG. 3, which illustrates the operational mode selection screen 54 projected on the screen 20 after powering up with machine 12 power on switch 24 activation and then an initial depressing of the enter/return key 42. As shown, the three operational modes are first, manual input, which is that mode selected by an operator for keying-in customer supplied specification data preparatory to accomplishing a particular bend profile. Second, auto input, which is that mode selected by an operator for downloading customer supplied specification data previously keyed-in at a remote location input terminal thereby eliminating operator make-ready time at machine 12 and optimizing operator production output time. And third, the calibration mode of operation wherein an operator calibrates the table bender controller 10 to the particular table bending machine 12 for either a particular bar or rod diameter being run with a particular center pin 32 diameter, or re-calibrates when there is a change in either the bar or rod diameter or center pin 32 diameter, or both. Once, however, a controller/machine calibration has been accomplished for a particular bar/rod and center pin diameter combination, that calibration is stored and may be utilized at a future time without re-calibration for bending runs involving the same bar/rod and center pin diameter combination. Assuming an initial run, with calibration being necessary, attention is now directed to FIG. 4.

Figure 4:
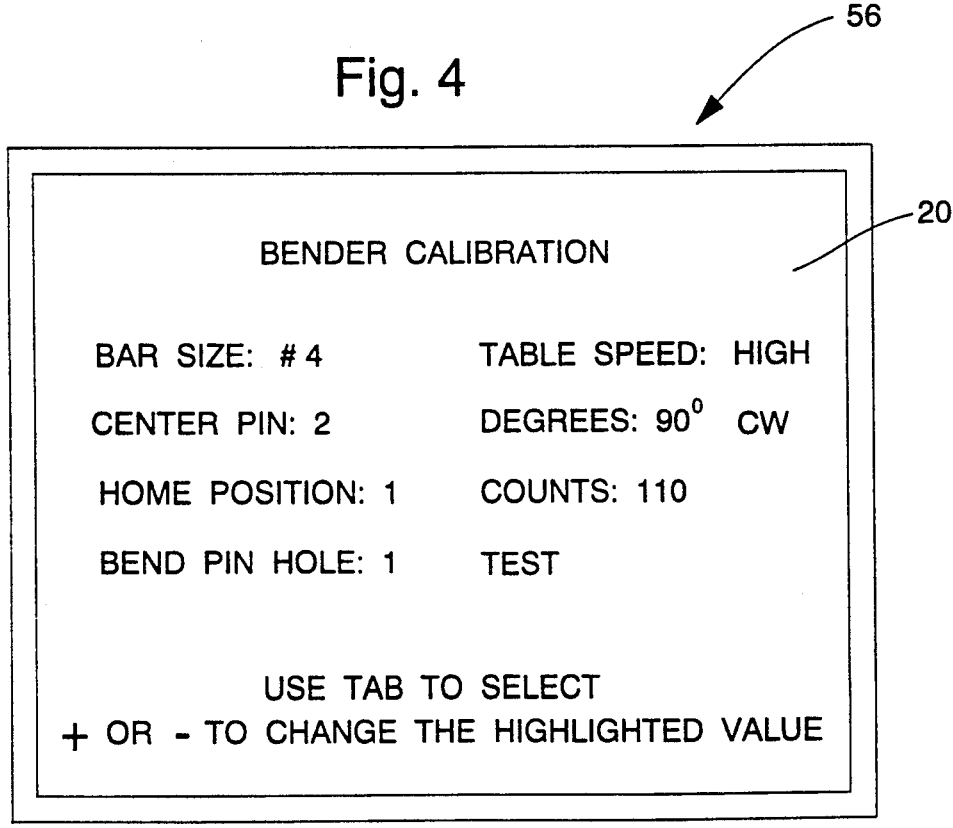
FIG. 4 is the table bender controller screen exemplary display for a bender calibration mode input function.

The view shown in FIG. 4 is that of the table bender controller 10 screen 20 exemplary display for the bender calibration mode input function 56, which in this particular exemplary case is for a bar size number 4 utilizing a center pin number 2 with the bend pin in hole position number 1 to execute a 90-degree clockwise bend at high table speed. In this case, the operator estimates that it will take 110 machine counts to execute the specified bend with the particular machine set-up he has experientially chosen, and in the calibration procedure the operator will next test to determine whether the estimated machine count is indeed correct, or whether more or less machine counts are needed to properly make the 90-degree clockwise bend with the specified bar size and indicated machine set-up. With the foregoing data entered in the bender calibration mode input function 56, the operator then selects and enters the calibration test mode 58, and attention is now directed to FIG. 5 for the calibration test procedure.

The illustration shown in FIG. 5 is that of the table bender controller 10 screen 20 exemplary test mode display for that calibration data as shown and explained on previous consideration of FIG. 4. The operator will now actually place a length of scrap number 4 bar in the table bending head and manually cycle the machine to execute a clockwise bend set at 90-degrees and 110 machine counts, which may or may not in fact yield a 90-degree bend. Afterwards the operator will measure the bend to determine if it is 90-degrees, or whether more or less machine counts are needed to make the 90-degrees, and adjust the machine count as he thinks appropriate with either the plus key 46 or minus key 48, and run another test bend. In this stepwise estimated set and adjust test procedure the operator will then calibrate the controller/machine combination to both 90 and 180-degree clockwise bends and 90 and 180-degree counterclockwise bends for the range of bar sizes the particular machine 12 is capable of running in each bar size and center pin 32 diameter combination that would normally be run, and set each machine count of calibration for those bends upon completion. In this manner the particular controller/machine combination is then calibrated to take bend profile input data, whether keyed-in by an operator or downloaded from a remote terminal location, and generate a graphically projected overall bend profile image on the screen 20 with the bend sequence and bar cut length at start to produce the specified length at end, as well as generating supplemental individual bend profiles with corresponding machine set instructions to be sequentially tabbed up in screen 20 display as the operator carries out the overall manually initiated bend cycle to produce the particular piece.

Turning attention now to FIG. 6, which illustrates a first exemplary customer provided bar shape specification job card 6 from which an operator obtains job specification input data for keyed-in entry to the table bender controller 10, and from which entered data the bend cycle profile graphical displays, bar cut length at start, bend sequence, and operator instructions for each individual bend are generated. The job card 60 shows that the operator is to make one piece, from number 4 bar, and the finished piece is to have a length of 8-feet and 6-inches. The job card 60 also provides the operator with a drawing of the piece to be made, showing the number and shape of the bends and the dimension of each leg between the bends thereof. With the job card 60 information the operator pulls up and selects the manual input mode as previously described, which projects on the screen 20 that image as shown in FIG. 7.

Figure 7:
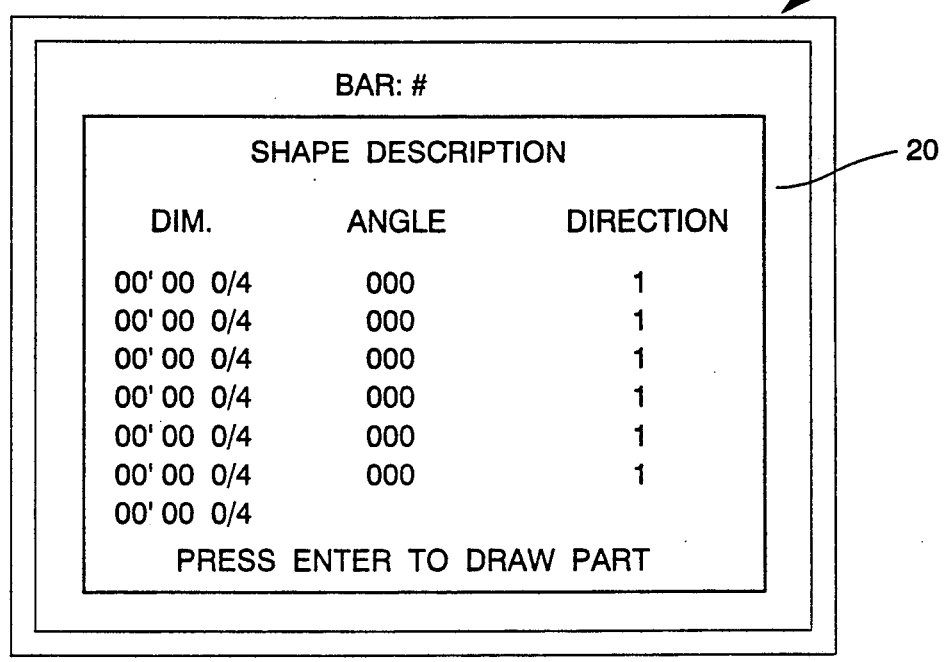
FIG. 7 is the table bender controller screen display for the manual input mode of input function.
Figure 8:
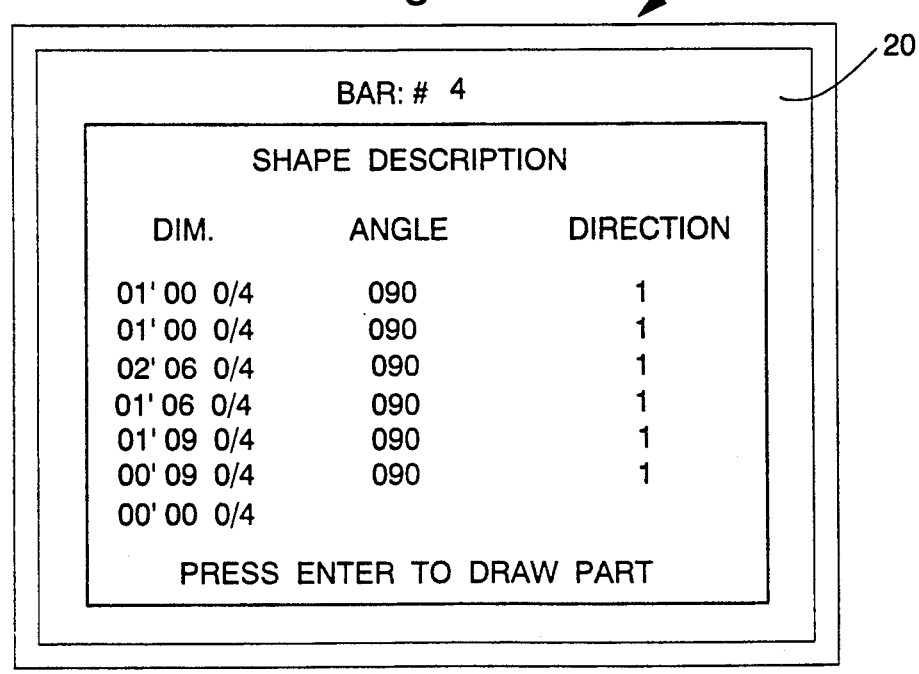
FIG. 8 is the table bender controller screen display showing entry of the customer provide d bar shape specification information as shown on the first exemplary job card illustrated in FIG. 6.

The view shown in FIG. 7 illustrates the null manual input screen 62, and includes a position for entry of the bar number of the working stock and then a shape description comprising sequential entry of a dimension in feet-inches-quarter inches or corresponding metric dimensions as the case may be, a bend angle in degrees, and a bend direction for each sequential bend of the profile to be formed, where the entry of a FIG. 1 represents one consistent sequential direction of bend and a FIG. 2 a represents a change in that sequential direction of bend, being respectively clockwise and counterclockwise. The view shown in FIG. 8 is that of the job specification data entered manual input screen 64, and illustrates the keyed-in entry of job specification data as it would appear on the screen 20 when taken from the first exemplary customer provided bar shape specification card 60 previously illustrated in FIG. 6, wherein the start point for sequential job specification data keyed-in entry of the dimension and bend angle and direction of bend was arbitrarily taken by the operator from end point "a" as shown in FIG. 6. The total number of bends to be made is five so there are five sets of entry, the bends are all 90-degrees, and all bends are progressively in the same direction, wherein the bend leg dimension from one bend leg to the next in this particular bend profile sequence is the only job specification component of change, and the last data entry position on screen 64, being the sixth position, is left null since the total number of bends is five. Upon completion of keyed-in entry of the job specification data from the customer provided bar shape specification card 60 as above described, the operator then depresses the enter key 42 and a replicated bend profile of the particular piece is the projected on the screen 20 as shown in FIG. 9.

Figure 9:
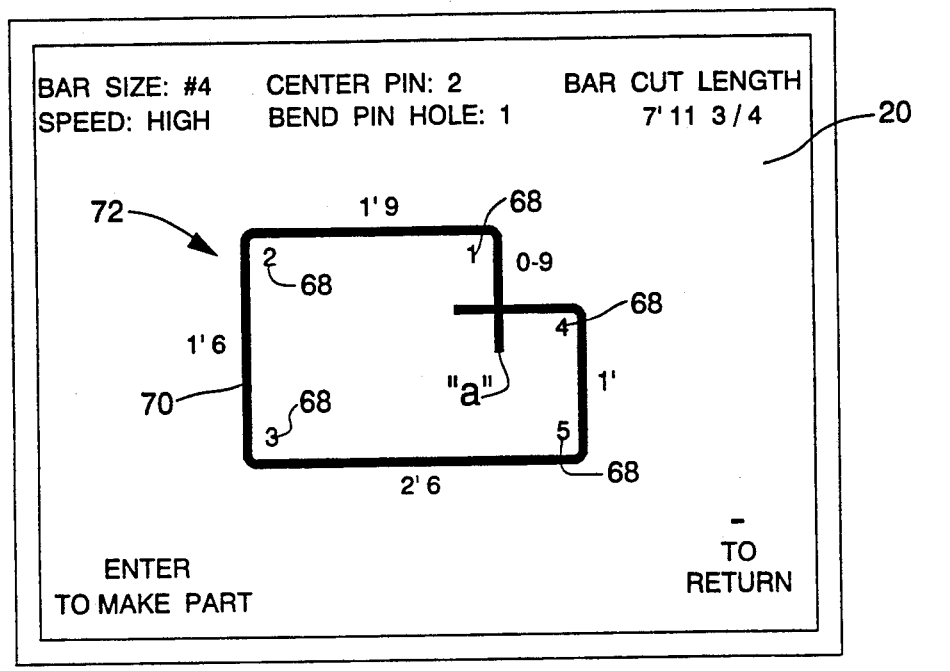
FIG. 9 is the table bender controller screen display showing graphical generation of the bar shape to be bent and the bending machine sets and bar cut length to produce that bar shape as specified on the first exemplary customer provided job card illustrated in FIG. 6.

Directing attention now to FIG. 9, which illustrates the drawn part screen 66 for the particular part to be made and replicates that profile as shown on the job card 60 but no with an additional showing of the bend sequence numbers 68, being the numbers 1 through 5 as shown at the interior bend angles of each bend to be made. It will also be noted that the bend sequence may not be in progressive numerical order, but is given in that order which is most efficient for fabricating the part while manually handling the bend stock 70 and cycling the machine 12. Additional operational information provided on the drawn part screen 66 is the recommended machine speed to be used, the size number of the center pin 32 to be used, the bend pin 30 opening hole location in which the bend pin 30 is to be placed and the bend stock 70 bar cut length to be used at the start to produce the specified end length of the part 72 to be made since the bend stock 70 will lengthen during a carrying out of the bending operations to be performed. After checking the profile and data entry information shown on the drawn part screen 66 against that as given on the customer provided bar shape specification card 60, the operator then presses the controller 10 enter key 42 to display the first bend screen 74 as shown in FIG. 10.

Figure 10:
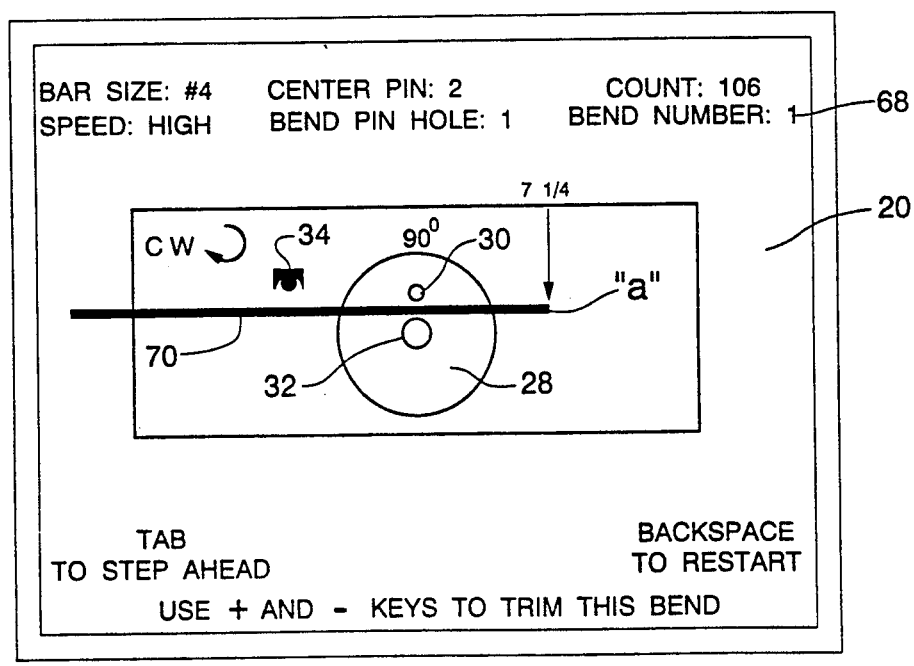
FIG 10 is the table bender controller screen display graphically illustrating operator instructions for executing the first bend of that bar shape as specified on the first exemplary job card illustrated in FIG. 6.

The view illustrated in FIG. 10, which is the graphical display projected on the screen 20 in a Visual profile corresponding to that to be bent showing an operator both machine 12 and bend stock 70 measurement data for accomplishing the first bend of the sequence 68 being 1 as shown in FIG. 9, with appropriate instructions for producing bend 1 of the sequence including a leg dimension of 7 ¼-inch to deliver a 9-inch leg after bend, the bend pin 30 and center pin 32 sizes and locations, the ram 34 location, the machine calibrated count number of 106 to generate the specified 90-degree bend, with a clockwise direction of bend. In the event there is an operator error or machine malfunction during accomplishment of the cycle for bend 1, the operator depresses the backspace key 50 to restart the cycle, or upon successful completion of bend 1 the operator depresses the tab key 52 to step ahead to the second bend screen 76. Also, in the event there is machine 12 drift from calibrated value for generating the specified bend degrees, or a difference in bending characteristics and properties between the working bend stock 70 and that of the stock which was employed for accomplishing calibration, an operator may employ the plus and minus keys 46 and 48 respectively to trim the bend and adjust machine set to a corrected value for continued running. Otherwise, the operator forwards with the tab key 52 to the second bend screen 76 as shown in FIG. 11.

In FIG. 11 a graphical display of the bend stock 70 is shown on the second bend screen 76 for accomplishing bend 2 of the sequence as shown on FIG. 9. Again, the machine 12 and bend stock 70 set and operational instructions, and measurement data are reflected in display on the screen 20 for the operator to carry out and produce bend 2 with the in process options of backspacing to restart, using the plus and minus keys 46 or 48 to trim the bend angle, or tab key 52 to forward to the third bend screen 78 as shown in FIG. 12 to accomplish bend 3 as shown in FIG. 9.

Figure 13:
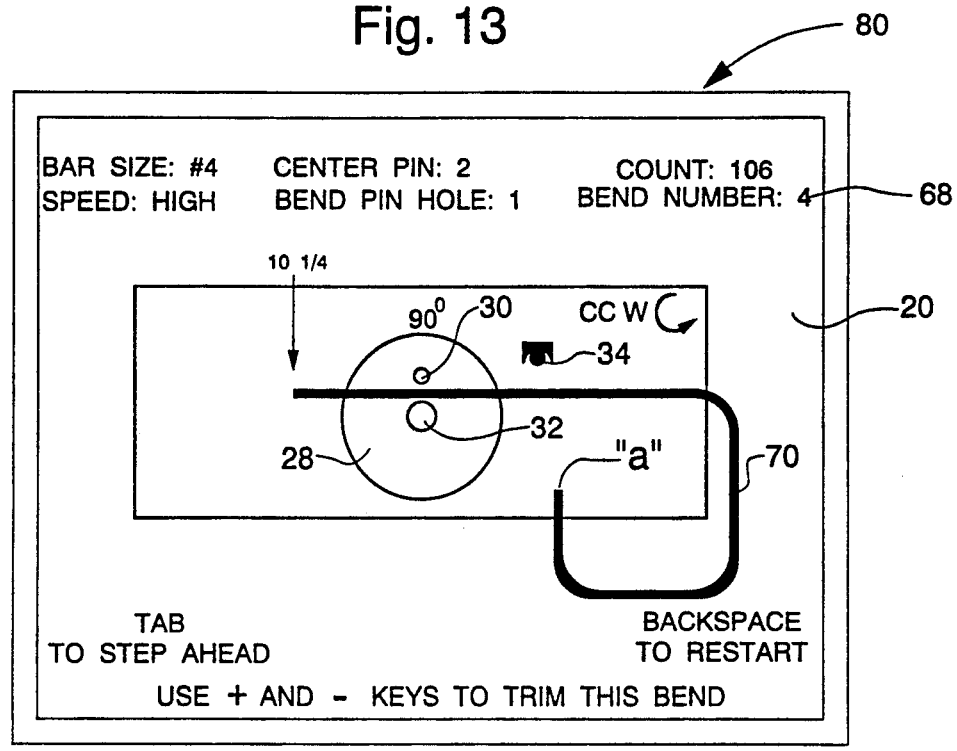
FIG. 13 is the table bender controller screen display graphically illustrating operator instructions for executing the fourth bend of that bar shape as specified on the first exemplary job card illustrated in FIG. 6.

As illustrated in FIG. 12, while the operator continues executing his bend sequence the partially completed bend profile which was previously accomplished is shown on the screen 20 and corresponds to the bend stock 70 workpiece profile of that part to be made as appears before the operator upon the table bending head 28 of the machine 12. This is a particularly valuable and efficient feature of the cooperative controller machine method herein taught in that the operator can at all times visually compare not only the profile but the measurements of the bend stock 70 as well as the machine 12 sets with the screen 20 graphics and information, which in turn provides significant operator convenience and assurance enhancement over currently available controller and equipment combinations in achieving manually cycled bending operations. As before, the method and technique for accomplishing the first and second bends as previously described are those which are likewise employed in carrying out an accomplishment of the third bend, following which the tab key 52 is used to step ahead to the fourth bend screen 80 as shown in FIG. 13.

The bending sequence 68 previously illustrated in FIG. 9 shows, for purposes of optimum ease and efficiency in accomplishing the bend profile of the part to be made 72, that the last bend of the profile with reference to the end point data entry start "a" is bend 4 of the sequence and in this case made in a counterclockwise direction. The fourth bend screen 80 as shown in FIG. 13 again provides, likewise as before, the graphics and bend profile information necessary to accomplish bend 4 by way of the method and technique herein taught, following which the tab key 52 is used to step ahead to the fifth bend screen 82 as shown in FIG. 14.

Figure 14:
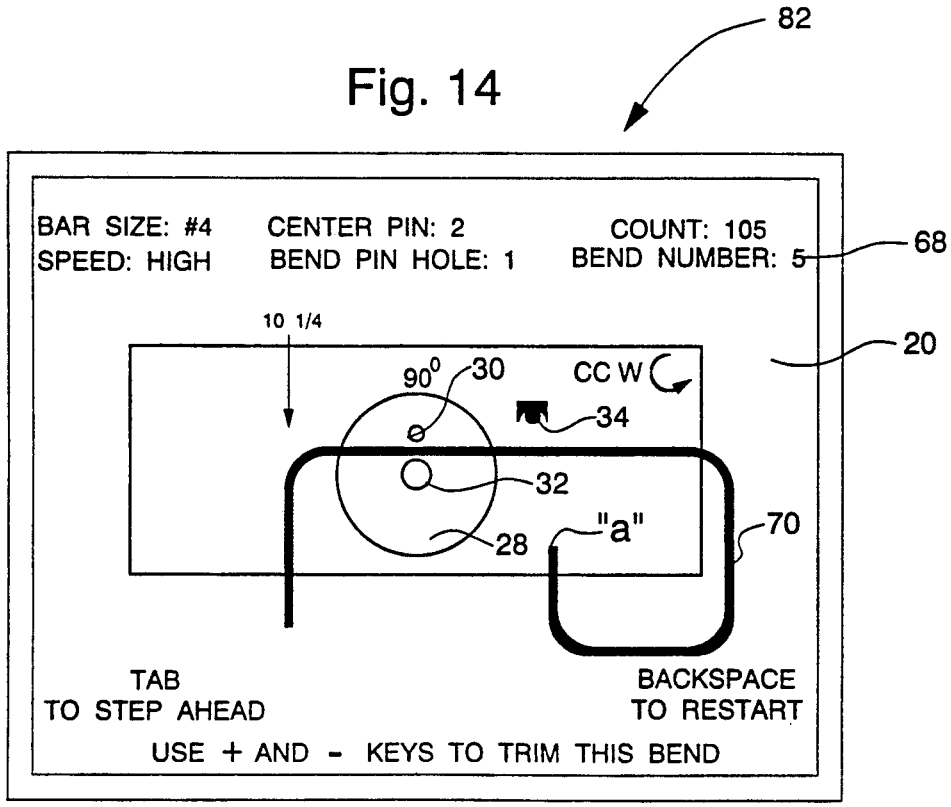
FIG. 14 is the table bender controller screen display graphically illustrating operator instructions for executing the fifth and last bend of that bar shape as specified on the first exemplary job card illustrated in FIG. 6.

The fourth bend of the profile is the last bend of the sequence, being bend 5 as previously illustrated in FIG. 9, and is again ordered in such a sequencing manner so as to optimize the ease and efficiency in accomplishing manually cycled execution of the bend profile of the part to be made 72 as illustrated in the fifth bend screen 82 shown in FIG. 14. It will be noted in the foregoing respect that bend 5 is also executed in a counterclockwise direction, upon completion of which the operator will either employ the backspace key 50 to restart and recycle the controller 10 in the above described manner if the making of more than one such part 72 is called for, or alternatively depresses the escape key 44 to recover the operational mode selection screen 54 whereby he may select the next and continuing mode of operation.

In practice of the foregoing method a standard lap top computer with screen or the equivalent thereof is respectively employed within the computer control console 16 and as the screen 20 in a conventional manner with respect to the operation and functioning thereof, incorporating a conventional interface connection therefrom through the cable conduit 22 to the table bending machine 12, all of which is driven by assignee's herein Copyrighted Program covered by Copyright Registration No. TX 3 332 675 dated Jun. 12, 1992, under the title of KRB BEND CONTROL, and as previously recited the table bending machine 12 is of typical design and conventional operation.

Figures 15, 16:
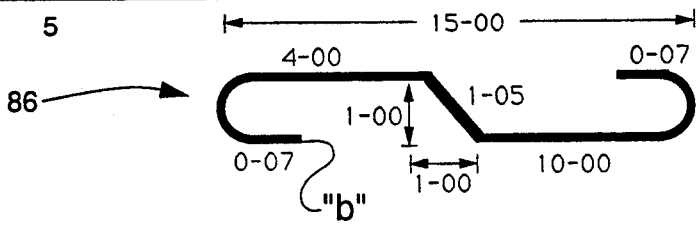
FIG. 15 is a second exemplary customer provided bar shape specification job card for operator keyed-in data entry to the table bender controller.
FIG. 16 is the table bender controller screen display showing entry of the customer provided bar shape specification information as shown on the second exemplary job card illustrated in FIG. 15.

Turning now to a consideration of FIG. 15, which illustrates a second exemplary customer provided bar shape specification card 84 giving the profile and specifications for a second part to be made 86, which is also of a bend stock 70 bar size 4, but in this instance a quantity of 5 such parts 86 are to be made, wherein it will be noted that the bend angles involved with this second part 86 are both 45-degrees and 180-degrees. Since the controller 10 has already been calibrated to the table bending machine 12 for a bend stock 70 bar size 4 and a center pin 32 size 2 it will not be necessary in this instance for the operator to re-calibrate, and he may go directly to the operational mode selection screen 54 as illustrated in FIG. 3 and by selecting the manual input mode as therein shown thereby in turn go directly to the null manual input screen 62 as previously shown in FIG. 7 and proceed to key in the bend specification data, in this case arbitrarily selected to be from the second part end point data entry start "b" to generate the second part bend specification data entered manual input screen 88 as illustrated in FIG. 16. Again, it is to be understood that such bend specification data could have been entered at a remote terminal location as previously described and downloaded by the operator through the auto input mode option as also illustrated in FIG. 3 of the operational mode selection screen 54. However, regardless of which mode was employed for entry of bend specification data, the operator next depresses the enter key 42 to generate a graphical image profile of the subject part along with dimensional information and the bend sequence as shown on the drawn part screen 66 illustrated in FIG. 17.

Figure 17:
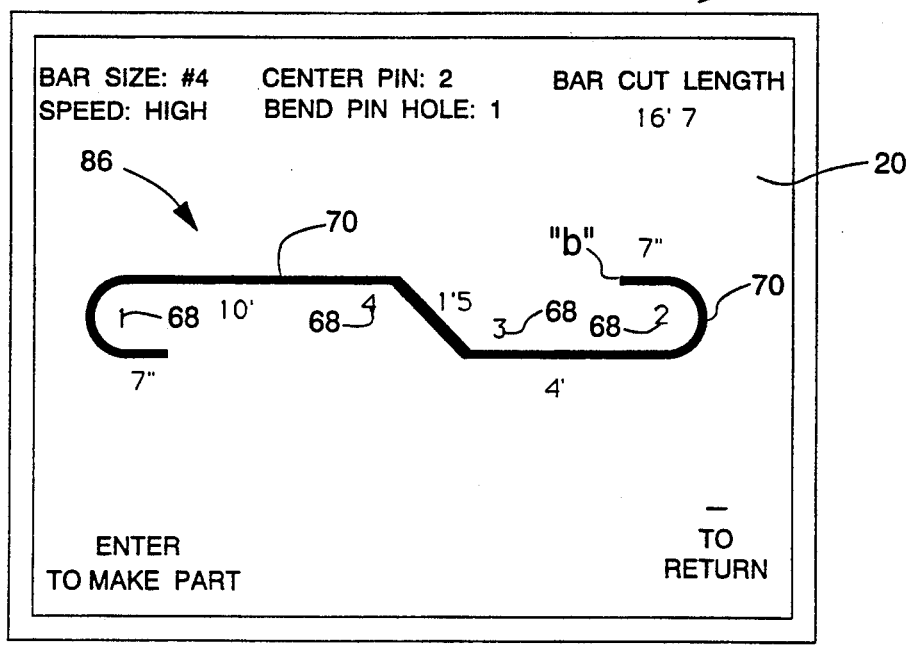
FIG. 17 is the table bender controller screen display showing graphical generation of the bar shape to be bent and the bending machine sets and bar cut length to produce that bar shape as specified on the second exemplary customer provided job card illustrated in FIG. 15.

Directing attention now to FIG. 17, which illustrates the drawn part screen 66 profile replication of the second part to be made 86 as previously shown on the bar shape specification card 84, again with an additional showing of the ben d sequence numbers 68, being the numbers 1 through 4 as shown at the interior bend angles of each bend to be made. Also again, it will be noted that the bend sequence numbers are not in progressive numerical order but are given in that order which is most efficient for fabricating the part while manually handling the bend stock 70 and cycling the machine 12. As previously, additional operational information provided on the drawn part screen 66 is the recommended machine speed to be used, the size number of the center pin 32 to be used, the bend pin 30 opening hole location in which the bend pin 30 is to be placed, and the bend stock 70 bar cut length to be used at the start to produce the specified end length of the part 86 to be made since as before the bend stock 70 will lengthen during a carrying out of the bending operations to be performed. Following an operator profile and data entry information check as reflected on the drawn part screen 66 against that as given on the second customer provided bar shape specification card 84, the operator then presses the controller 10 enter key 42 to display the second part first bend screen 90 as shown in FIG. 18.

Figure 18:
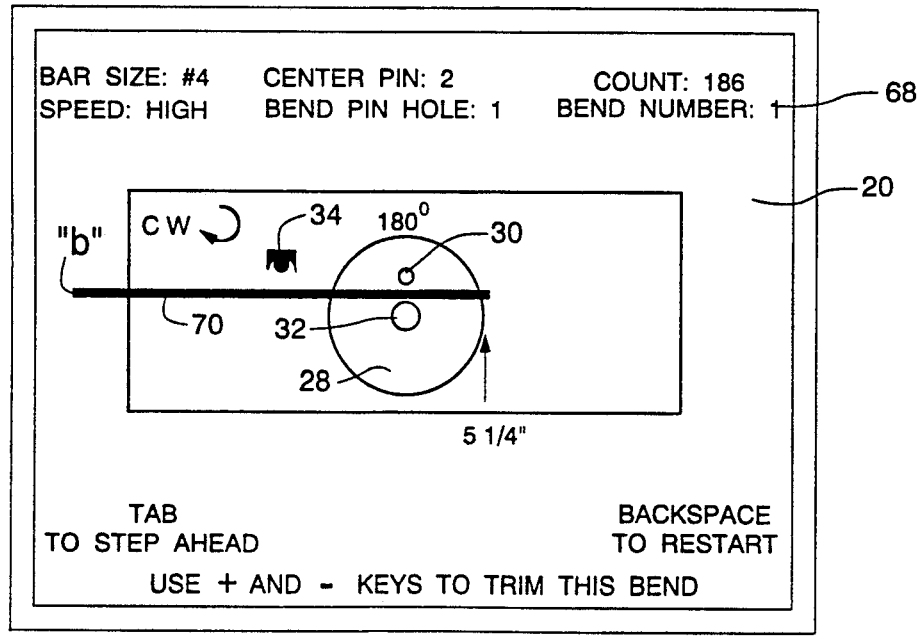
FIG. 18 is the table bender controller screen display graphically illustrating operator instructions for executing the first bend of that bar shape as specified on the second exemplary job card illustrated in FIG. 15.
Figure 19:
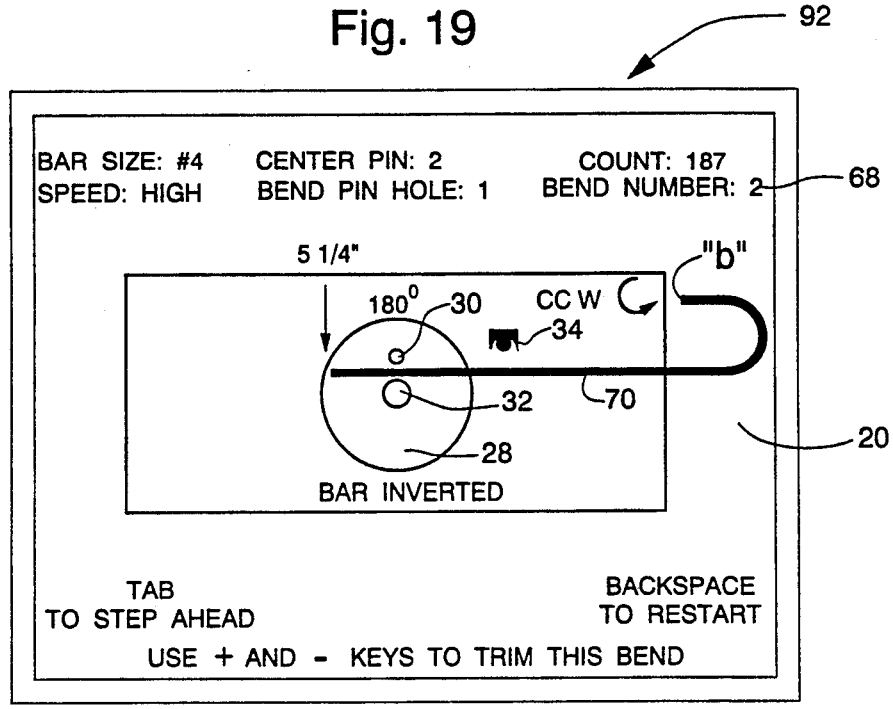
FIG. 19 is the table bender controller screen display graphically illustrating operator instructions for executing the second bend of that bar shape as specified on the second exemplary job card illustrated in FIG. 15.

The view illustrated in FIG. 18 is a graphical projection on the screen 20 of a visual profile providing operator information corresponding to the first bend to be made, showing both machine 12 and bend stock 70 measurement data for accomplishing the same as shown in FIG. 17, including a leg dimension of 5 ¼-inch to deliver a 7-inch leg after a 180-degree bend, the bend pin 30 and center pin 32 sizes and locations, the ram 34 location, and the machine calibrated count number of 186 to generate the specified 180-degree bend with a clockwise direction of bend. Upon successful completion of the first bend the operator depresses the tab key 52 to step ahead to the second part second bend screen 92 as shown in FIG. 19. Alternately, in the event there is a machine 12 drift from calibrated value for generating the specified 180-degree bend, or a difference in bending characteristics and properties between the working bend stock 70 and that of the stock which was employed for accomplishing calibration, the operator employs the plus and minus keys 46 and 48 respectively to trim the bend and adjust the machine set to a corrected value for continued running. Also, in the event there was an operator error or machine malfunction during accomplishment of the cycle for the first bend, the operator depresses the backspace key 50 to restart the cycle and re-execute the bend. Otherwise, the operator forwards with the tab key 52 to the second part second bend screen 92 as shown in FIG. 19.

Figure 20:
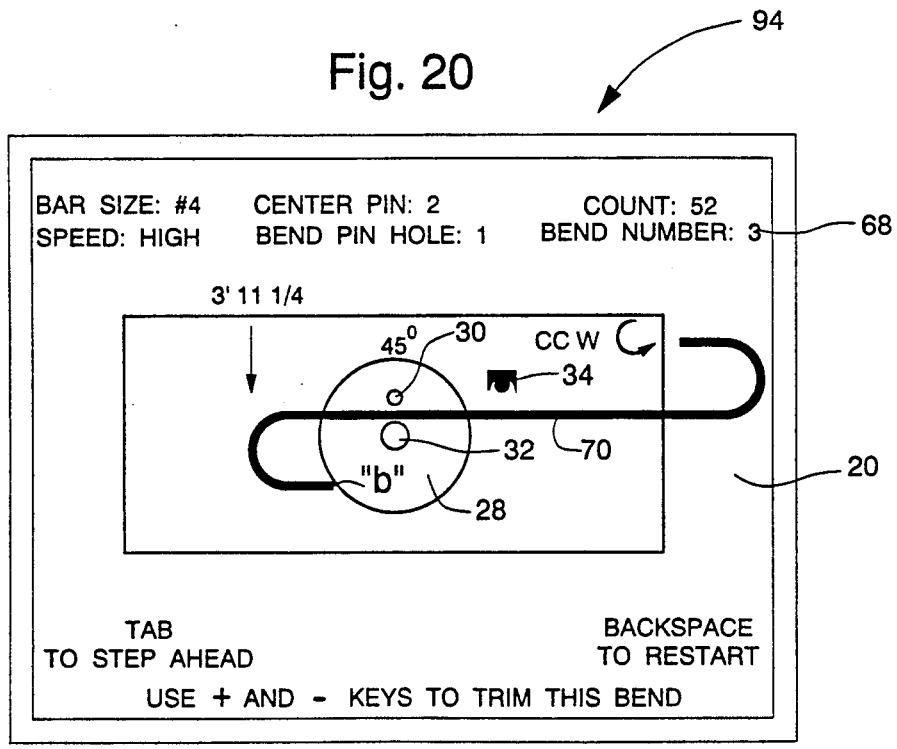
FIG. 20 is the table bender controller screen display graphically illustrating operator instructions for executing the third bend of that bar shape as specified on the second exemplary job card illustrated in FIG. 15.
Figure 21:
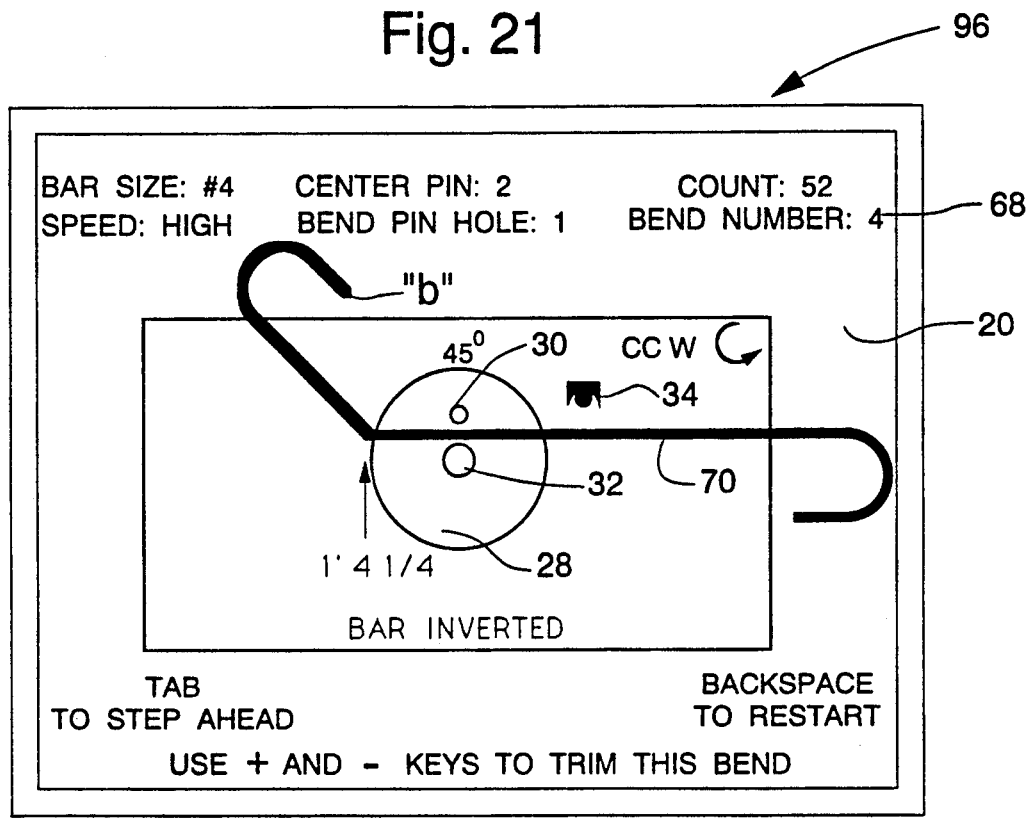
FIG. 21 is the table bender controller screen display graphically illustrating operator instructions for executing the fourth and last bend of that bar shape as specified on the second exemplary job card illustrated in FIG. 15.

In FIG. 19 a graphical display of the bend stock 70 is shown on the second part second bend screen 92 for accomplishing bend 2 of the sequence as shown on FIG. 17, wherein again the machine 12 and bend stock 70 set and operational instructions, and measurement data are reflected in display on the screen 20 for the operator to carry out and produce bend 2, with the in process options of backspacing to restart, using the plus and minus keys 46 or 48 to trim the bend angle or tab key 52 to forward to the second part third bend screen 94 as shown in FIG. 20 and thereafter to the second part fourth bend screen 96 as shown in FIG. 21.

Upon completion of the first piece of the second part the operator will employ the backspace key 50 to recycle the controller 10 to the second part first bend screen 90 and begin a bending and completion of the second piece of the second part, and so on in a like manner until all five pieces of the second part are made. Thereafter, new part profile specifications from customer job cards are either entered to the controller 10 at the machine 12 location, or downloaded by the operator from a remote terminal location, and the process continues.

Although the table bender controller invention hereof, the structural characteristics and method of employment thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

We claim:

1. A table bender controller operationally interfaced through a cable conduit means in electronically connected combination with a manually cycled table bending machine for bending a bar stool piece into a specified workpiece shape, said controller further comprising in combination an enclosure cabinet adapted to support a computer and a screen in electronically integrated connection through a control console having a data input means, a first computer program within said computer adapted to receive an input of workpiece bend profile specification data and be accessed by means of said data input means, a second computer program means adapted to calibrate an integration of bend execution commands from said controller to bend execution functions of said machine and the machining characteristics of a sample of said bar stock piece to be bent, a third computer program means adapted to process said input of bend profile specification data and project a sequential digitally annotated bend profile graphical image for each of a successively separate bend sequence instruction projection upon said screen whereby a table bending machine operator is visually instructed sequentially at the workstation location through the bending of said workpiece shape in a graphically screen projected digitally annotated visual image step-by-step process, and a fourth computer program means adapted to download bend profile specification data entered as an alternate access from a remote interfaced bend profile specification data input terminal location.

2. A table bender controller according to claim 1 wherein said data input means is a plurality of function keys.

3. A workstation computer generated and screen projected graphical instruction method for enhancing operator control of a manually cycled table bending machine while sequentially carrying out the bending of a bar stock piece into a specified workpiece shape, said method comprising the steps of calibrating an integration of the bend execution commands of a bending machine interfaced controller computer to the bend execution functions of said table bending machine and the machining characteristics of a sample of said bar stock piece to be bent, entering workpiece bend data specification information into said bending machine interfaced controller computer, initiating a controller computer generated screen projected graphical profile display with digitally annotated bend execution instruction data for the workpiece shape at the workstation location, operator cycling said controller computer to successively project individual sequential workpiece bend profile graphics and digitally annotated bend execution instructions upon the workstation screen, and manually cycled step-by-step bendable formation of said workpiece shape sequentially in accordance with said succession of controller computer generated screen projected graphical profile displays with digitally annotated bend execution instruction data.

4. The method according to claim 3 wherein the entering of workpiece bend data specification information into the bending machine interfaced controller computer is accomplished by the operator at the workstation location.

5. The method according to claim 3 wherein the entering of workpiece bend data specification information into the bending machine interfaced controller computer is accomplished at a remote interfaced bend profile specificaition data input terminal location and downloaded therefrom to the controller computer.

* * * * *